United States Patent [19]

Jazlowski et al.

[11] 4,272,026
[45] Jun. 9, 1981

[54] SPRINKLING DEVICE FOR ABSORPTION TOWERS

[75] Inventors: Aleksander Jazłowski; Rudnicki Michał; Bartosz Tadeusz; Czelny Zdzisław, all of Gliwice; Zurkowski Jozef, Gieraltowice; Romańczyk Henryk, Katowice, all of Poland

[73] Assignee: Biuro Studiow, projetow i Realizacji in Westycji Przemyslu Nieorganicznego "Biprokawas", Gliwice, Poland

[21] Appl. No.: 954,212

[22] Filed: Oct. 24, 1978

[51] Int. Cl.³ .............. B05B 1/20; B05B 1/30; B05B 15/06

[52] U.S. Cl. ................. 239/273; 239/557; 239/562; 239/565; 261/98

[58] Field of Search ............. 239/266, 450, 562, 569, 239/548, 565, 273, 556, 557; 261/97, 98, 103, 106, 111; 55/241; 137/872, 875, 883

[56] References Cited

U.S. PATENT DOCUMENTS

| 1,036,674 | 8/1912 | Meurling | 137/883 X |
| 1,760,782 | 5/1930 | Seeley | 137/872 X |
| 2,820,479 | 1/1958 | Jenkins, Jr. | 137/872 X |
| 3,158,171 | 11/1964 | Eckert | 261/97 |
| 3,419,251 | 12/1968 | Eckert | 239/450 X |
| 3,880,189 | 4/1975 | Bennett | 137/883 |

FOREIGN PATENT DOCUMENTS 1114806 5/1968 United Kingdom .
1425007 2/1976 United Kingdom .
1431502 4/1976 United Kingdom .

*Primary Examiner*—Andres Kashnikow
*Attorney, Agent, or Firm*—Haseltine and Lake

[57] ABSTRACT

A sprinkling device for absorption towers comprising collectors for feeding sprinkling troughs of rectangular section with an acid and also constituting a support structure for the troughs. The collectors rest on a tower jacket by supports placed in cavities in the jacket. The sprinkling troughs contain sprinkling tubes and are fastened to the side walls of the collectors by flange joints. The outflow of liquid from the collectors to the individual sprinkling troughs is controlled by diaphragms situated where the liquid leaves the collectors and flows towards the troughs.

4 Claims, 2 Drawing Figures

SPRINKLING DEVICE FOR ABSORPTION TOWERS

FIELD OF THE INVENTION

The invention relates to a sprinkling device for absorption towers or for other apparatus in which mass exchange occurs between liquid and gases.

PRIOR ART

The known sprinkling device for absorption towers, used for uniformly distributing an acid onto the cross section of the tower, comprises a system of feeding pipelines, sprinkling troughs and sprinkling tubes built in the bottom of the troughs.

The sprinkling troughs are situated horizontally in the towers and their extremities rest on a supporting ring formed by a lining and a jacket of the tower.

The pipeline system feeding the sprinkling troughs with the liquid is situated above the sprinkling troughs and consists of a distributing collector and pipelines which connect the collector with the sprinkling troughs. The distributing collector rests on the jacket of the absorber in suitable cavities. The pipelines feeding the sprinkling troughs are equipped with suitable damping connector pipes which provide for quiet flow of liquid, and also are equipped with flanges which provide for uniform distribution of the liquid in the sprinkling troughs.

The sprinkling tubes built in the bottom of the sprinkling troughs provide for uniform distribution of the acid onto the cross section of the tower and simultaneously for proper sprinkling of the tower packing.

A drawback of the hitherto used sprinkling device is its considerable weight.

A second drawback of the hitherto used device is the use of a ring for supporting the troughs, said ring being fastened to the jacket of the tower. This ring, placed at a great distance from the bottom of the tower and provided with the same lining as the tower, causes the necessity of using special ceramic profiles which enable expansion of the lining with regard to the jacket of the tower. Although the expansion area is sealed with asbestos rope, with time it becomes a potential source of leakage and thereby of corrosion of the tower jacket.

A third drawback of the hitherto used device is the necessity of using tanks which damp the perturbations in the liquid passing from the distributing collectors to the sprinkling troughs.

A fourth drawback of the hitherto used device is that in order to control the outflow of the liquid from the collectors to the sprinkling troughs, the outflow connector pipes are equipped with flanges whose diameters are adjusted experimentally by additional mechanical treatment after the device is set in motion.

SUMMARY OF THE INVENTION

An object of the invention is to eliminate the above-mentioned drawbacks.

In the sprinkling device for absorption towers according to the invention, the collectors feed sprinkling troughs of rectangular section with acid and also constitute a support structure for the troughs and rest on the tower jacket by means of supports placed in cavities of the jacket. The sprinkling troughs containing the sprinkling tubes are fastened to the side walls of the collector by means of flange connections. The outflow of the liquid from the collectors to the individual sprinkling troughs is controlled by means of diaphragms situated at the location where the liquid leaves the collectors and flows towards the troughs.

The advantages of the sprinkling device for absorption towers according to the invention are its considerably smaller weight and reduction of the height of the tower in which the installation is mounted.

The additional advantage of the device according to the invention when compared with the existing device is that the diaphragm used in the invention enables control of the outflow of the liquid from the collectors to the sprinkling troughs without the necessity of disassembling the control element and treating it mecanically.

DETAILED DESCRIPTION

Figure 1:
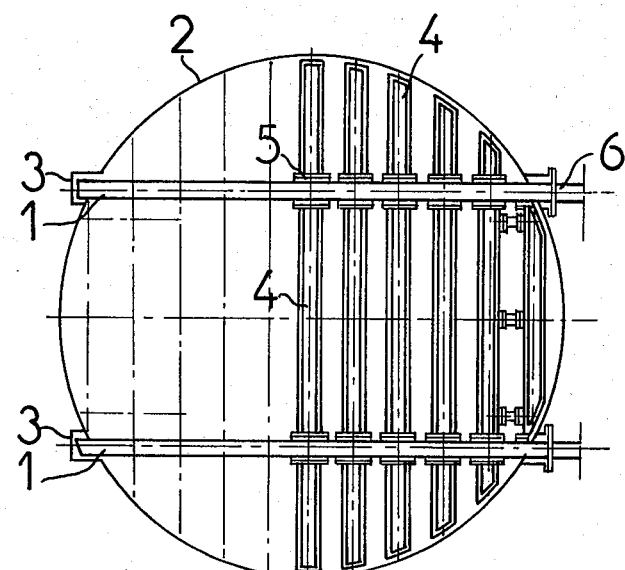
FIG. 1 is a top plan view of the sprinkling device according to the invention.
Figure 2:
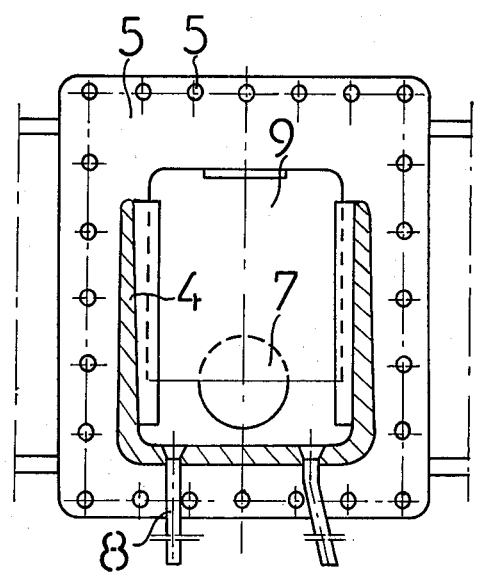
FIG. 2 is a cross-section through a part of the device showing, the side wall of one of the collectors together with the sprinkling tubes built into its bottom.

Referring to the drawing, therein is shown a sprinkling device which comprises a collector 1 for receiving liquid, the collector being supported by a tower jacket 2 for distribution of the liquid into a series of parallel troughs 4 of generally rectangular section. At the bottom of the troughs are sprinkling tubes 8 by which the liquid can be discharged into the tower.

The sprinkling troughs 4 are fastened to the collector 1 by means of flange joints 5, the collector resulting on the tower jacket 2 in cavities 3. The liquid is supplied to the collector 1 through a connector pipe 6 from which it enters the sprinkling troughs 4 through orifices 7 situated in the side wall of each of the collectors. The size of the orifices 7 through which liquid enters the respective trough 4 is controlled by a diaphragm 9 or valve plate. The liquid leaves the sprinkling trough to sprinkle the packing in the tower, through the sprinkling tubes 8.

What we claim is:

1. A sprinkling device for an absorption tower comprising a collector extending at a level above the tower for distribution of liquid into the tower, means for supplying liquid to said collector, a jacket having cavities in which said collector is supported, feeding troughs for receiving liquid from said collector for distribution into said tower, said collector including a side wall, flange connectors connecting the troughs to said side wall of the collector, said side wall of the collector having orifices for feeding liquid to said feeding troughs, valve plates at said orifices for controlling the outflow of liquid to said feeding troughs, and sprinkling tubes connected to said troughs for distributing the liquid in the troughs into the tower.

2. A device as claimed in claim 1 wherein said feeding troughs are of rectangular section.

3. A device as claimed in claim 1 wherein said valve plates are slidably mounted in proximity to said orifices.

4. A device as claimed in claim 1 wherein said sprinkling tubes are mounted in said feeding troughs at the bottom thereof and depend from said troughs.

* * * * *